United States Patent [19]
Platz

[11] 3,792,814
[45] Feb. 19, 1974

[54] PORTABLE LIQUID FERTILIZER SPRAYING APPARATUS

[76] Inventor: Edward A. Platz, Opossum Rd., Bellemead, N.J. 08502

[22] Filed: Mar. 24, 1972

[21] Appl. No.: 237,826

[52] U.S. Cl.............. 239/149, 239/172, 239/176, 298/17 B
[51] Int. Cl....................... B05b 9/00, B05b 15/04
[58] Field of Search .... 222/178; 239/149, 172, 176; 298/7, 17 B

[56] References Cited
UNITED STATES PATENTS

| | | | |
|---|---|---|---|
| 2,005,896 | 6/1935 | Hurt | 298/7 UX |
| 3,125,345 | 3/1964 | Ellis | 298/7 X |
| 513,132 | 1/1894 | McClanathan | 298/17 B |
| 3,160,439 | 12/1964 | Kazakowitz | 298/17 B UX |
| 1,822,207 | 9/1931 | Fox | 239/176 X |

FOREIGN PATENTS OR APPLICATIONS

| | | | |
|---|---|---|---|
| 259,402 | 10/1926 | Great Britain | 239/149 |

Primary Examiner—Robert S. Ward, Jr.

[57] ABSTRACT

Spraying apparatus for use with a shipping container having an outlet for dispensing a material to be sprayed stored within the container comprising spraying means communicating with the outlet of the container, a support frame including a pair of wheels, the frame having a fulcrum point, a container-engaging means attached to the frame at the fulcrum point, spray stabilizing means attached to the container-engaging means and engaging the spray means and angle adjustment means attached to the container-engaging means and the frame to adjust the container-engaging means to a predetermined angle relative to the frame, whereby the height of the spray means above the ground is adjusted in order to vary the concentration of the spray.

14 Claims, 6 Drawing Figures

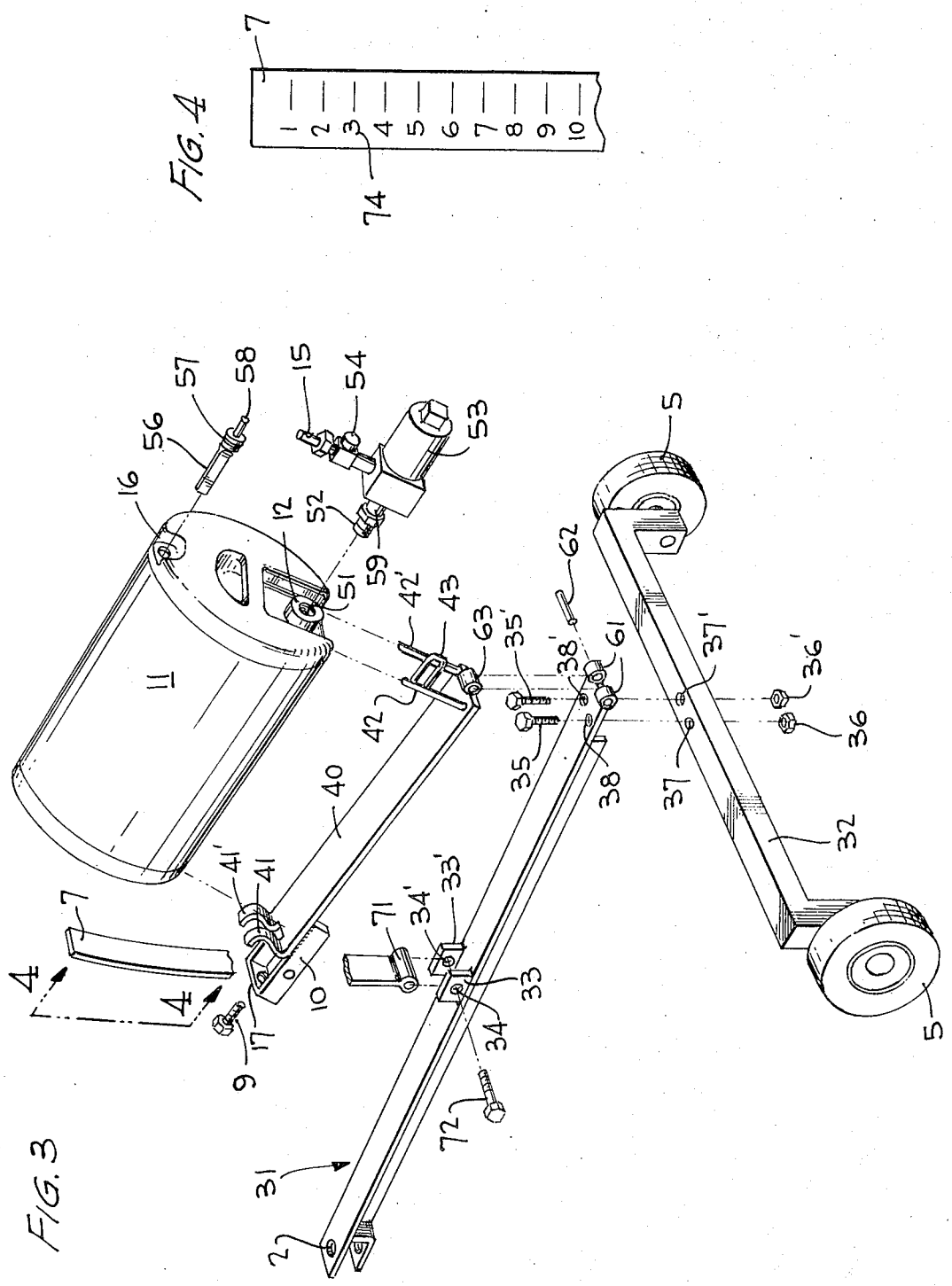

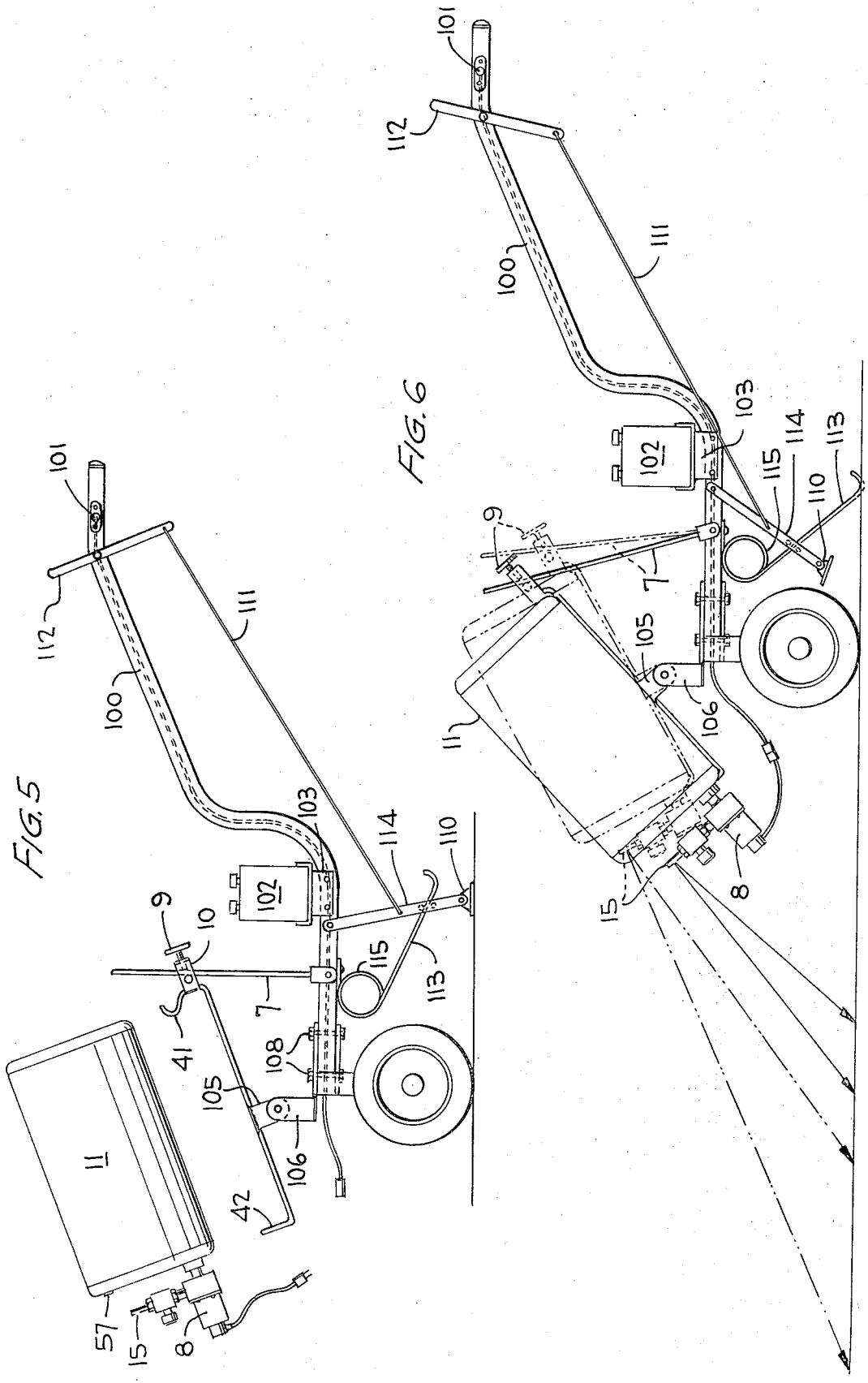

PORTABLE LIQUID FERTILIZER SPRAYING APPARATUS

BACKGROUND OF THE INVENTION

This invention relates to spraying apparatus for use in fertilizing small areas such as lawns, etc. More particularly, this invention relates to a fertilizer spraying apparatus which can be adjusted to spray fertilizer at various concentrations and which can spray this fertilizer directly from the shipping container.

Many home owners, especially those with somewhat large lawns, find it difficult to adequately fertilize their lawns utilizing conventional granular fertilizer spreaders. Liquid fertilizers which have a great number of uses have not been utilized to any great extent on a consumer level since there has been heretofore no convenient method for applying liquid fertilizers directly and efficiently to the soil on small areas. No spraying apparatus for use in applying these liquid fertilizers directly from standard shipping containers, which may be reused and refilled, to the soil or grass have been previously available thereby eliminating any disposal problem encountered with disposable containers such as bags etc. and, further, any available liquid spraying apparatus have not been easily or conveniently adjustable so as to be capable of applying various concentrations of liquid fertilizer to the soil without the use of a garden hose which adds unneeded water to the soil.

BRIEF DESCRIPTION OF THE INVENTION

It is within the above environment that the spraying apparatus of the present invention was developed. Briefly, this apparatus comprises spraying means which can be mounted on the shipping container outlet, a support frame, a container-engaging means mounted on this support frame and angle adjustment means attached to the container-engaging means and the support frame so that the height of the spraying means above the ground is adjusted in order to vary the concentration of the spray.

It is, therefore, the primary object of the present invention to provide a simple spraying apparatus for use with liquid fertilizer for dispensing the same directly from the shipping container.

It is further an object of the present invention to provide a spraying apparatus which can be easily and conveniently adjusted to provide for various concentrations of liquid fertilizer to be sprayed on the soil.

It is a still further object of the present invention to provide a spraying apparatus which can be either pushed by hand or pulled by a conventional lawn tractor.

It is a still further object of the present invention to provide a novel trailer or support apparatus for use with a liquid fertilizer shipping container and a spray pump.

Still further objects and advantages of the apparatus of the present invention will become more apparent from the following more detailed description and the attached drawings.

BRIEF DESCRIPTION OF THE DRAWINGS

FIG. 3 is an exploded view of the apparatus of the present invention.

FIG. 4 is a view taken along line 4—4 of FIG. 3.

FIG. 5 is a side view of a second embodiment of the apparatus of the present invention.

FIG. 6 is a side view of the second embodiment of the present invention with the support stand in the upper position disengaging a drag which marks the area sprayed.

DESCRIPTION OF THE PREFERRED EMBODIMENTS

Figure 1:
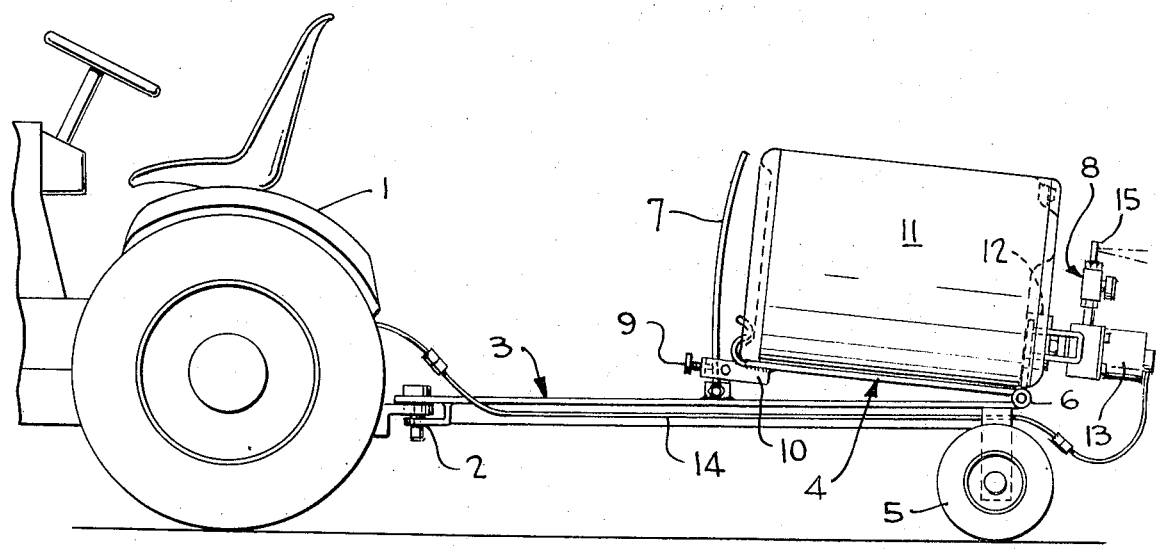
FIG. 1 is a side view of one embodiment of the present invention.
Figure 2:
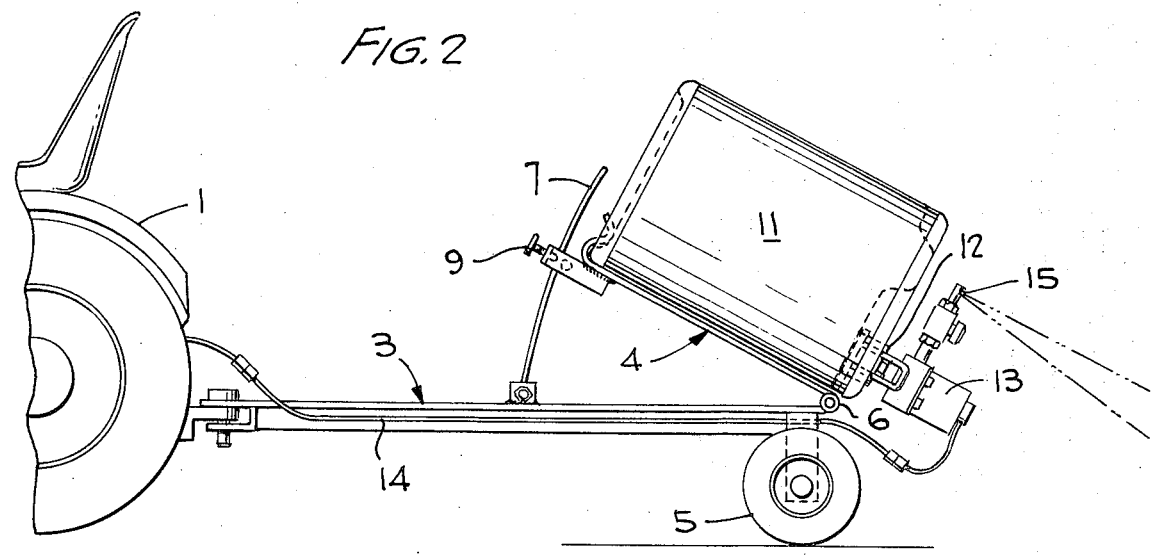
FIG. 2 is a side view of the embodiment as shown in FIG. 1 with the apparatus raised to the upper position.

Referring to FIGS. 1 and 2 which are side views of the first embodiment of the apparatus of the present invention, the apparatus is drawn by a conventional garden tractor 1 by means of trailer hitch 2. The trailer hitch 2 is directly attached to frame 3 which in turn is mounted on a pair of wheels 5. Frame 3 is connected to container-engaging means 4 by pivot point 6. Container-engaging means 4 is pivotally connected to frame 3 also connected to U-clamp 10 through which upright bar 7 extends. U-clamp 10 also has a screw 9 which contacts upright bar 7 to hold container-engaging means 4 in proper position. The shipping container 11 is placed directly on container-engaging means 4 after pump and spray assembly 8 is mounted on the opening thereof by means of modified closure cap 12. Spray pump assembly 8 includes a low voltage pump which is actuated and connected electrically to the battery of lawn tractor 1 means of cables 14. In use the operator determines the concentration of fertilizer which the lawn requires and sets the container-engaging means at a predetermined angle with respect to support frame 3 by means of U-clamp 10, upright bar 7 and screw 9. Once the angle has been determined, the operator pulls the assembly and actuates pump 13 by means of a switch located somewhere on the tractor so as to spray the fertilizer from tank 11 through nozzle 15.

FIG. 3, which is an exploded view, shows details of the fertilizer sprayer of the present invention. Support frame 3 comprises a straight bar 31 which may be a T-shaped member or other structural shape having trailer hitch 2 attached to one end thereof, a pair of members 33 and 33' each having a hole 34 and 34' therethrough mounted on bar 31 in an intermediate position and a hinge mount 61 attached to the other end of bar 31 from trailer hitch 2. U-shaped frame 32 having a pair of wheels 5 mounted thereon is attached to bar 31 by means of bolts 35 and 35' which pass through holes 37, 37' and 38, 38' in U-shaped frame 32 and bar 31, respectively, bolts 35 and 35' being fastened by nuts 36 and 36'. Support frame 3 is attached to container-engaging means 4 by means of pivot point 6 which comprises hinge assembly 61 attached to bar 31 and mating hinge assembly 63 attached to container-engaging means body 40. These respective hinge assemblies 61 and 63 are attached by pin 62 so that container-engaging body 40 and bar 31 can be pivoted to any angle relative to each other. Container-engaging means 4 comprises a container-engaging body or platform 40 which is generally flat upon which the bottom of container 11 rests when inserted into container-engaging means 4. Container 11 is firmly held in place in container-engaging means 4 by means of clips 41 and 41' which engage the recessed bottom portion of container 11 and by prongs 42 and 42' which make an acute angle with body portion 40 and contact the top of container 11, thereby causing container 11 to be wedged in place by clips 41 and 41' and prongs 42 and 42'. Attached to one prong 42 is a spray unit stabilizing means 43; this stabilizing means contacts the side of spray unit 8 to maintain the same in a fixed position relative to container-engaging means 4. Attached to the end of container-engaging means body 40 near clips 41 and 41' is U-clamp 10. Set screw 9 fits into threaded hole 17 in the bottom of U-clamp 10. Upright bar 7 which has a hinge member 71 at the bottom edge thereof extends through U-clamp 10. This upright bar 7 is 34 and 34' and through the interior of hinge member 71 allowing upright bar 7 to rotate as container-engaging body 40 is raised to a less acute angle.

Spray assembly 8 is attached directly to the outlet of container 11 by means of a modified closure cap 12 which engages the threaded neck of container 11 and has an interior threaded portion 51. Threaded portion 51 mates with male thread 52 on conduit 59 includes a pair of screens (not shown) which insures no solid material reaches pump 53, leading to the inlet of pump 53. At the outlet of pump 53 is a valve member 54 which in turn is attached directly to spray nozzle 15. In order that pressure does not build up within container 11, a pressure releasing valve 57 is screwed into air vent hole 16. Pressure releasing valve 57 is a one-way valve having a rubber reed or flapper valve 56 which prevents liquid fertilizer from flowing out through valve 57 while allowing air to pass in through conduit 58 in valve 57 and reed valve 56 in order to maintain an atmospheric pressure within container 11.

FIG. 4 shows a view of the reverse side of upright bar 7 and shows indicia 74 which is placed on bar 7 so that an accurate determination of the amount of material being dispensed through spray nozzle 15 can be made and reliable and accurate results can be obtained with the apparatus of the present invention.

FIGS. 5 and 6 show a side view of a hand operated embodiment of the fertilizing sprayer of the present invention. Support frame 3' is essentially similar to the tractor drawn model except that trailer hitch 2 has been replaced by handle 100. Mounted on handle 100 at a point convenient to the operator is an electric control switch 101 which controls the electric current fed to spray pump assembly 8 from battery 102 mounted on support frame 3' by means of mounting brackets 103. Container-engaging body 40 has hinge member 105 attached part way back from the pump end to provide better balance for the hand operated model. Generally, it has been found that if hinge member 105 is set back from 2 to 8 inches from the end of container-engaging body 40 a more satisfactory balance for hand operated use is obtained. Hinge member 105 is attached to mating hinge member 106 by means of a hinge pin 107. Mating hinge member 106 is attached to support frame 3' by means of a series of bolts 108. The hand operated model also may include a tripod support member 110 which is actuated by means of cable 111 and handle 112. This support member 110 is pivotally attached to support frame 3 so that when handle 112 is actuated, tripod support 110 moves upward and to the left as shown in FIG. 6 and out of the way so that the apparatus may be easily pushed. Also included in support assembly 110 is an indicating spring 113 which is held by means of cable attachment 114 on tripod 110. As tripod stand 110 is moved upward and to the left, spring 115 urges indicating spring 113 downwardly so that the same contacts the grass and lightly marks the same to indicate the path traveled.

Generally, it has been found that any conventional spray nozzle may be utilized for the spray nozzle of the present invention; however, it is preferred to utilize a nozzle which produces a flat spray. Also, although a nozzle which produces an even spray pattern can be utilized, it is preferred to utilize a nozzle which produces an eliptical pattern, i.e. one which is slightly heavier in the middle than on the end, so that some overlap will produce an even overall spray with no missed spots.

Also, the tractor pulled embodiment as shown in FIGS. 1, 2 and 3 may include a spring marker similar to that shown in FIGS. 5 and 6.

The pump utilized in spraying means 8 can be any low voltage centrifugal or positive displacement pump made from non-corrosive materials. Generally, it has been found that pumps which produce a pressure of 5 psig are satisfactory although this pressure is in no way critical.

While the apparatus of the present invention has been illustrated by way of the foregoing drawings which show specific embodiments of such apparatus, these embodiments are to be taken as in no way limiting the apparatus of the present application, the same being properly defined in the appending claims and including any and all equivalents thereto.

What is claimed is:

1. Spraying apparatus for use with a shipping container having an outlet for dispensing a liquid material to be sprayed stored within the container, said apparatus comprising:
   spraying means communicating with the outlet of said container;
   a support frame including a pair of wheels;
   means for frictionally engaging said container, said engaging means pivotally attached to said support frame and including means to engage said spraying means so that said spraying means is held in one position relative to said container and said container-engaging means; and
   angle adjustment means attached to said support frame and said container-engaging means to adjust said container-engaging means to a predetermined angle relative to said support frame, whereby the height of said spraying means above the ground is adjusted in order to vary the width and concentration of the spray.

2. The apparatus of claim 1 wherein said pair of wheels is attached to one end of said support frame and said support frame further includes a trailer hitch attached to said frame at the end opposite said pair of wheels.

3. The apparatus of claim 2 wherein the spraying means includes an electrically operated pump.

4. The apparatus of claim 1 wherein said pair of wheels is attached to one end of said support frame and said support frame further includes a handle disposed at the end of said support frame opposite said pair of wheels so that said apparatus may be pushed by hand.

5. The apparatus of claim 4 including a tripod support stand pivotally attached to said frame, said support stand engaging a spring member mounted on said support so that when said stand is not in use said spring member contacts the ground.

6. The apparatus of claim 4 wherein said spraying means includes an electrically operated pump and said pump is powered by a rechargeable battery mounted on said support frame.

7. The apparatus of claim 1 wherein said angle adjustment means includes indicia calibrated to the output of said spraying means.

8. Spraying apparatus comprising:

a shipping container having an outlet for dispensing a material to be sprayed stored within the container;

spraying means communicating with the outlet of said container;

a support frame including a pair of wheels;

container-engaging means pivotally attached to said support frame, said container-engaging means frictionally engaging the top and bottom of said container and frictionally holding said container in a fixed position relative to said support frame; and angle adjustment means attached to said frame and said container-engaging means to adjust said container engaging means to a predetermined angle relative to said frame whereby the height of said spraying means above the ground is adjusted in order to vary the width and concentration of the spray.

9. The apparatus of claim 8 wherein said pair of wheels is attached to one end of said support frame and said support frame further includes a trailer hitch attached to said frame at the end opposite said pair of wheels.

10. The apparatus of claim 9 wherein the spraying means includes an electrically operated pump.

11. The apparatus of claim 8 wherein said pair of wheels is attached to one end of said support frame and said support frame further includes a handle disposed at the end of said support frame opposite said pair of wheels so that said apparatus may be pushed by hand.

12. The apparatus of claim 11 including a tripod support stand pivotally attached to said frame, said support stand engaging a spring member mounted on said support so that when said stand is not in use said spring member contacts the ground.

13. The apparatus of claim 11 wherein said spraying means includes an electrically operated pump and said pump is powered by a rechargeable battery mounted on said support frame.

14. The apparatus of claim 8 wherein said angle adjustment means includes indicia calibrated to the output of said spraying means.

* * * * *